(12) United States Patent
Dufva et al.

(10) Patent No.: US 8,532,669 B2
(45) Date of Patent: Sep. 10, 2013

(54) LOCATION SERVICES INTERWORKING WITH INTELLIGENT NETWORK

(75) Inventors: Tatu Dufva, Helsinki (FI); Janne Muhonen, Helsinki (FI)

(73) Assignee: Nokia Corporation, Espoo (FI)

( * ) Notice: Subject to any disclaimer, the term of this patent is extended or adjusted under 35 U.S.C. 154(b) by 449 days.

(21) Appl. No.: 12/768,413

(22) Filed: Apr. 27, 2010

(65) Prior Publication Data

US 2010/0210286 A1 Aug. 19, 2010

Related U.S. Application Data

(63) Continuation of application No. 10/312,143, filed on Apr. 25, 2003, now Pat. No. 7,738,885.

(30) Foreign Application Priority Data

Jun. 22, 2000 (GB) .................................. 0015365.0

(51) Int. Cl.
*H04Q 7/20* (2006.01)

(52) U.S. Cl.
USPC .................. 455/456.1; 455/456.2; 455/404.1; 455/445; 455/422.1; 370/310; 370/328; 370/338; 370/343; 379/221.08; 379/221.09; 379/221.12

(58) Field of Classification Search
USPC ............. 455/456.1–457, 404.1, 404.2, 422.1, 455/426.1, 426.2, 445, 432.1, 432.2, 550.1, 455/517, 406–408, 560; 370/310, 328, 338, 370/343, 310.2; 379/221.08, 221.09, 221.12
See application file for complete search history.

(56) References Cited

U.S. PATENT DOCUMENTS

| | | | |
|---|---|---|---|
| 5,596,625 A | 1/1997 | LeBlanc | |
| 5,839,076 A * | 11/1998 | Becher | 455/461 |
| 6,002,936 A | 12/1999 | Roel-Ng et al. | |
| 6,128,481 A | 10/2000 | Houde et al. | |
| 6,138,026 A | 10/2000 | Irvin | |
| 6,233,445 B1 | 5/2001 | Boltz et al. | |
| 6,266,533 B1 | 7/2001 | Zadeh et al. | |
| 6,292,666 B1 * | 9/2001 | Siddiqui et al. | 455/456.4 |
| 6,985,742 B1 | 1/2006 | Giniger et al. | |
| 2004/0176123 A1 | 9/2004 | Chin et al. | |
| 2004/0229620 A1 | 11/2004 | Zhao et al. | |

FOREIGN PATENT DOCUMENTS

| | | |
|---|---|---|
| GB | 2 344 024 A | 5/2000 |
| WO | WO 99/55114 | 10/1999 |

OTHER PUBLICATIONS

International Preliminary Examination Report for corresponding PCT App. No. PCT/IB01/01272 dated Nov. 1, 2002, pp. 1-6.
International Search Report for corresponding PCT App. No. PCT/IB01/01272 dated Oct. 11, 2001, pp. 1-6.

* cited by examiner

*Primary Examiner* — Keith Ferguson
(74) *Attorney, Agent, or Firm* — Ditthavong Mori & Steiner, P.C.

(57) ABSTRACT

The invention provides location information indicating the geographical location of a mobile station via a core net-work node serving the mobile station The method includes the steps of initiating a communication between the mobile station and the network by calculating the geographical location, supplying corresponding location information indicating the geographical location to the core network node, and subsequently routing the communication between the mobile station and the network.

61 Claims, 5 Drawing Sheets

LOCATION SERVICES INTERWORKING WITH INTELLIGENT NETWORK

CROSS-REFERENCE TO RELATED APPLICATIONS

This patent application is a continuation of, and claims priority to, U.S. patent application Ser. No. 10/312,143 filed on Apr. 25, 2003, the entirety of which is incorporated herein by reference.

BACKGROUND OF THE INVENTION

1. Field of the Invention

The present invention relates to the location services in a telecommunications network. In particular, but not exclusively, the invention relates to intelligent networks (IN)'s in which the IN service is able to control call setup based on the location of a mobile station (MS). The invention may also provide methods to supply IN service with location of a mobile station with minimum delay for call establishment (or setup) procedure.

2. Description of Related Art

An intelligent network (IN) is a telecommunications network architecture which can relocate services and databases via switches to one or more control/decision nodes to thereby provide intelligent control of a call or other event. The GSM network for example, offers IN-based services. These services can be "forwarded" at any stage when a subscriber having access to a mobile network is abroad in a foreign country with which the home operator has a reciprocal roaming agreement.

Customized applications for mobile network enhanced logic "CAMEL" is the GSM and UMTS arrangement which makes operator-specific services available to subscribers who are outside their own network.

A basic idea behind the architecture of INs is to make the service logic independent of switching and transport in the network. The network functions which provide these attributes and which form the IN architecture are service switching and service control. Service switching is found in a service switching point (SSP), which is a node with functions to detect calls to the IN service, and the service control point (SCP) which is a generally centrally located node and which contains the logic and data for the IN services.

The location services (LCS) feature in GSM and UMTS provides the mechanism to support mobile location services of operators which are not covered by standardised GSM or UMTS services. LCS utilizes one or more positioning mechanisms in order to determine the location of an MS. Positioning of a target MS involves two principle steps. These are signal measurements and location estimation in which the location is calculated based upon the measured signals.

A number of location estimating mechanisms are known for use with LCS. These are the time of arrival (TOA), enhanced observed time difference (E-OTD), observed time difference of arrival (OTDOA), and global positioning system (GPS) positioning mechanism. Through use of one of these the LCS provides means to locate a mobile station. The public land mobile network (PLMN) will thus provide a location application with the geographical location of the MS. The location application which uses this information may reside within the PLMN (in either the MS or in the network itself) or outside the PLMN (in an external application).

Positioning may be initiated either by the network or an external application. The role of the core network nodes in relation to the LCS is to convey positioning requests towards the serving mobile location centre (SMLC) and location information towards the requesting gateway mobile location centre (GMLC). Furthermore, the core network nodes may identify events such as emergency call setups which will require initiation of positioning of a mobile station.

In the past the procedure by which position information of the MS has been provided to the IN has been reactive. That is to say when a call to/from a MS has been requested, the location of the MS has then been calculated, if it was needed for a value added service (e.g. an IN/CAMEL service) This has the problem of delaying the call establishment until after the location has been established.

It is an object of the present invention to at least partly mitigate the above-referenced problems.

SUMMARY OF THE INVENTION

According to a first aspect of the present invention there is provided a method for providing a location application of a communication network with location information indicating the geographical location of a mobile station (MS), via a core network node serving the MS, said method comprising the steps of;

initiating a communication between the MS and the network by the steps of;
   calculating the geographical location;
   supplying corresponding location information indicating the geographical location to the core network node; and
   subsequently routing the call between the MS and the network.

This has the advantage that the location of the MS is established early in a call cycle so that the core network node has the location at the beginning of a call setup procedure.

Embodiments of the present invention provide that the MS independently calculates its location which is sent in the SETUP message to the core network. The core network thus has the location information without additional requests being required.

According to a second aspect of the present invention there is provided a method for providing a location application of a communication network with location information indicating the geographical location of a mobile station (MS), via a core network node serving the MS, said method comprising the steps of initiating a communication between the MS and the network, calculating the geographical location, supplying corresponding location information indicating the geographical location to the core network node, and providing the said geographical location from the core network node to a service control means in association with at least one communication control related event.

Embodiments of the present invention provide that when the MS makes a request for radio connection setup the RAN initiates position calculation of the MS and provides this location to the core network at the beginning of a call or other similar event. In this way, the core network has the location information without additional requests.

Embodiments of the present invention will now be described hereinafter with reference to the following drawings, in which;

DETAILED DESCRIPTION OF THE PREFERRED EMBODIMENT(S)

Figure 1:
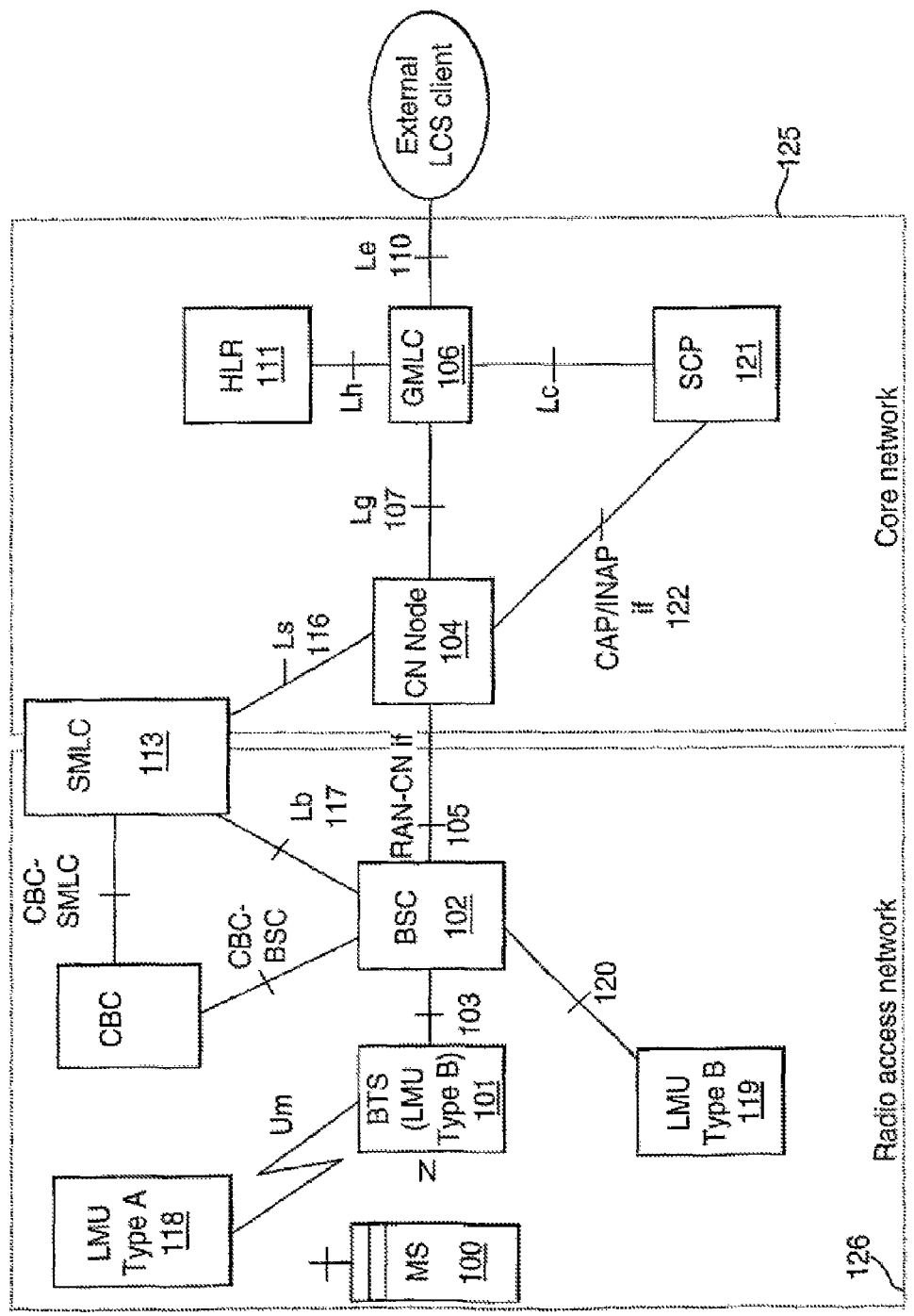
FIG. 1 shows a generic LCS logical architecture.

Location services (LCS) is logically implemented on the GSM/UMTS structure through the addition of one network node, the mobile location centre (MLC). A generic LCS logical architecture is shown in FIG. 1.

A mobile station (MS) 100 can be a mobile telephone or a laptop computer which has a radio modem or a fax adapted for radio access. The term MS is used here also to cover UMTS User Equipment (UE). This communicates with the base transceiver station (BTS) 101 over the radio interface ($U_m$ interface). The term BTS is used here also to cover UMTS Terrestrial Radio Access Network (UTRAN) corresponding network element Node B. The BTS is equipped for transmission and reception of signals and additionally has ciphering equipment. The BTS in term communicates with a base station controller (BSC) 102 via link 103 (Abis in GSM, Iub in UMTS). The term BSC is used here also to cover UMTS Terrestrial Radio Access Network (UTRAN) corresponding network element Radio Network Controller (RNC). The BSC sets up the radio channels for signaling and traffic to the Core Network (CN) node 104 via link 105. This forms part of the Core Network 125.

The CN node can be either mobile switching centre (MSC) or Serving GPRS Support Node (SGSN) depending on switching domain, circuit switched or packet switched. The CN node 104 is essentially a switching node having many functions. In particular, the CN node performs connection management, mobility management and authentication activities. In this document CN node is also supposed to contain call control function, and service switching function defined by IN/CAMEL architecture. However, in packet switched domain these before mentioned CN node functions may be split to separate network elements. Each CN node can control a number of BSCs which are referred to as being in an CN node service area. In general BTSs and BSCs together form the Radio Access Network (RAN) 126, which is referred as Base Station Sub-system (BSS) in GSM and UMTS Terrestrial Radio Access Network (UTRAN) in UMTS.

The CN node 104 is connected to the gateway mobile location centre (GMLC) 106 via the $L_g$ interface 107 which contains functionality required to support LCS. In one PLMN there may be more than one GMLC. The GMLC is the first node an external LCS client accesses in a GSM PLMN.

An LCS client 109 is a logical functional entity that requests, from the LCS server function in the PLMN, location information for one or more target MS within a specified set of parameters such as quality of service ($Q_oS$). The LCS client may reside in an entity (including the MS), within the PLMN or in an entity external to the PLMN. An external LCS client 109 communicates with the GMLC 106 via the $L_e$ interface.

In response to a location request from an LCS client, the GMLC may request routing information from the home location register (HLR) 111 of the system via the $L_h$ interface 112. The HLR is a database which allows a mobile subscriber to be permanently registered in the system. The HLR keeps track continuously of the location of a subscriber or MS in the level of serving CN node, i.e. Visitor Location Register (VLR) or SGSN. In addition to the HLR, each CN node 104 is associated with a database containing details of subscribers temporarily in the service area of that CN node. In circuit switched domain this database is called Visitor Location Register (VLR), and in packet switched domain the database is contained in SGSN.

After performing registration authorization the GMLC 106 sends positioning requests to and receives final location estimates from, the CN node that is having the service area in which the MS is currently located (or visiting).

The serving mobile location centre (SMLC) 113 contains functionality required to support LCS. In one PLMN there may be more than one SMLC 113. The SMLC 113 manages the overall coordination and scheduling of resources required to perform positioning of a mobile. It also calculates the final location estimate and accuracy.

Two types of SMLC are possible. These are the Core Network (CN) based SMLC, which supports the $L_s$ interface 116 which is the interface between the serving MLC and CN node, and the Radio Access Network (RAN) based SMLC which supports the $L_b$ interface 117 between the SMLC 113 and the BSC 102. An CN based SMLC supports positioning of a target MS via signaling on the $L_s$ interface to the visited CN node. A RAN based SMLC supports positioning via signaling on the $L_b$ interface. In UMTS, SMLC functionality is contained in BSC 102, i.e. Radio Network Controller (RNC).

The SMLC controls a number of location measurement units (LMU)'s for the purpose of obtaining radio interface measurements to locate or help locate MS subscribers in the area that it serves.

In order to provide location information about the MS 100, the MS may be involved in various positioning procedures. It may also calculate its own location estimate and accuracy with means of MS based positioning methods like MS based E-OTD or GPS.

Time of Arrival (TOA) Positioning Mechanism

The uplink TOA positioning method is based on measuring the time of arrival of a known signal sent from the mobile and received at three or more measurement units. The known signal is the access bursts generated by having the mobile perform an asynchronous handover. The method requires additional measurement unit (LMU) hardware in the network at the geographical vicinity of the mobile to be positioned to accurately measure the TOA of the bursts. Since the geographical coordinates of the measurement units are known, the mobile position can be calculated via hyperbolic triangulation.

Enhanced-Observed Time Different (E-OTD) Positioning Mechanism

In GSM radio access the E-OTD method is based on measurements in the MS of the enhanced observed time difference of arrival of bursts of nearby pairs of BTS's. For E-OTD measurement synchronization, normal and dummy bursts are used. When the transmission frames of BTS's are not synchronized, the network needs to measure the relative or absolute time differences (RTD's or ATD's) between them. To obtain accurate triangulation, E-OTD measurements and, for non-synchronized BTS's, RTD or ATD measurements are needed for at least three distinct pairs of geographically dispersed BTS's. Based on the measured E-OTD values, the location of MS can be calculated either in the network or in the MS itself, if all the needed information is available in the MS. In UMTS radio access (Wideband CDMA), principally similar positioning method is called Observed Time Difference of Arrival-Idle Period DownLink (OTDoA-IPDL).

Global Positioning System (GPS) Positioning Mechanism

The global positioning system (GPS) method refers to any of several variants that make use of GPS signals or additional signals derived from GPS signals in order to calculate MS positions. These variants give rise to a range of optional information flows between the MS and the network. One dimension of variation is where position calculation is performed. Another dimension is whether "assistance data" is required irrespective of where position calculation is performed. Examples of assistance data include differential GPS data; lists of satellites in view based on approximate MS positions etc. A third dimension of variation is closely related to the proceeding, namely, the origin and distribution of any assistance data. For example, even while assistance data may be required of a GPS method it may be optional that the assistance data originates from and is distributed within and by the PLMN.

The location measurement units (LMU) make radio measurements to support one or more of these positioning measurements.

Two types of LMU are defined. Type A LMU 118 which is accessed over the air interface ($U_m$) and type B LMU 119 which is accessed over the interface 120 to the BSC 102.

A type A LMU is accessed exclusively over the GSM air interface (Um) interface. There is no wired connection to any other network element. A type A LMU has a serving BTS and BSC that provide signaling access to a controlling SMLC. With an CN based SMLC a type A LMU also has a serving CN node.

A type B LMU is accessed over the interface 120 from a BSC. The LMU may be either a stand alone network element addressed using some pseudo-cell ID or connected to, or integrated in, a BTS. Signaling to a type B LMU is by means of messages routed through the controlling BSC for a BSS based SMLC or messages routed through a controlling BSC and CN no for an CN based SMLC.

For Location Services, with a Cell Broadcast Center (CBC) associated with a BSC, the SMLC may interface to a CBC in order to broadcast assistance data utilising existing cell broadcast capabilities. The SMLC shall behave as a user, Cell Broadcast Entity, to the CBC.

Figure 2:
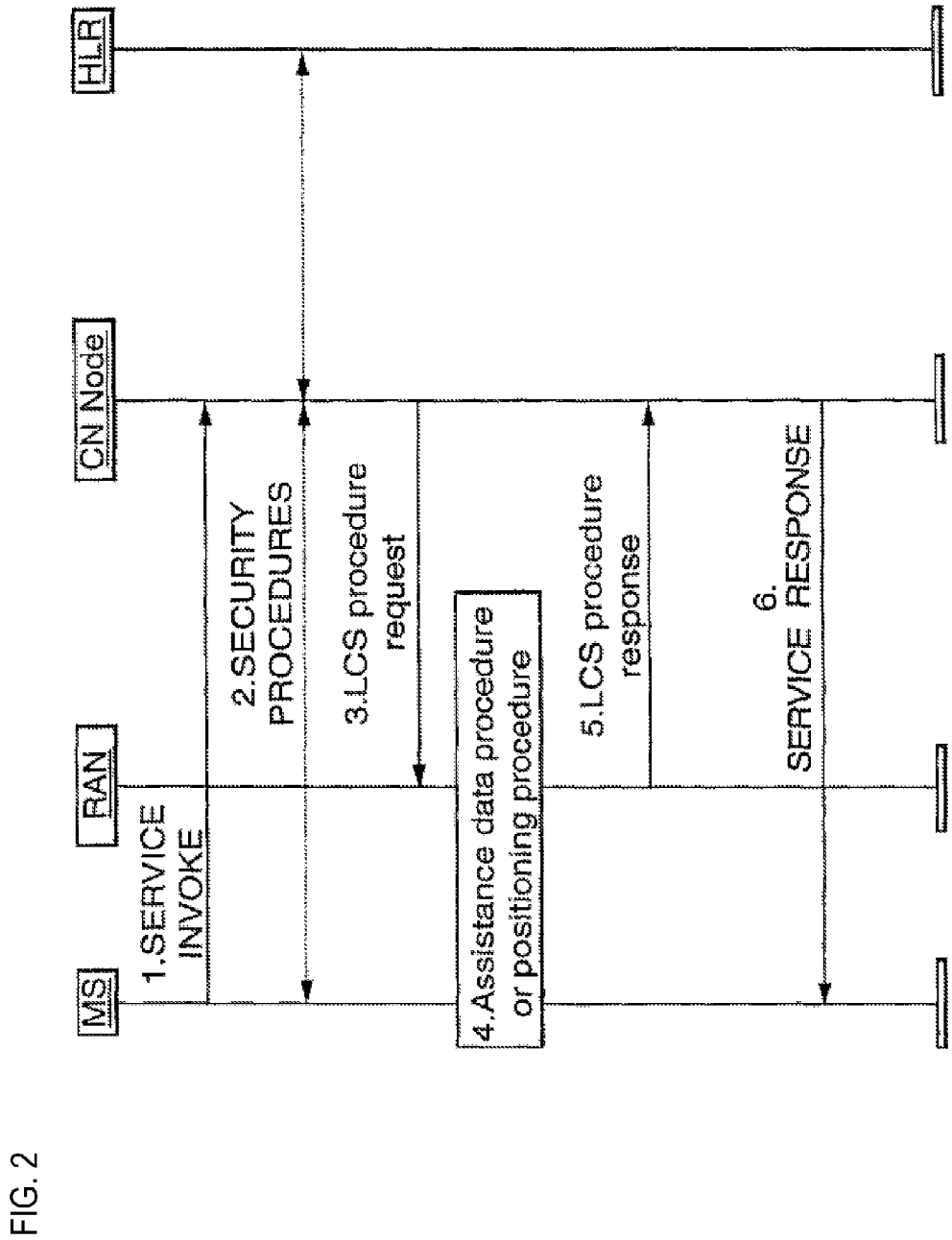
FIG. 2 illustrates a conventional location procedure.

FIG. 2 illustrates a conventional procedure allowing a MS to request either its own location, location assistance data or broadcast assistance data message ciphering keys from the network. Location assistance data may be used subsequently by the MS to compute its own location throughout an extended interval. The ciphering key enables the MS to decipher other location assistance data broadcast periodically by other networks.

With this system the LCS provides the means to locate a mobile station. The PLMN will provide a location application with the geographical location of the MS. The location application utilizing this information may reside within the PLMN or outside the PLMN. Positioning itself may be initiated either by the network or an external application. The role of the CN regarding LCS is to convey positioning requests towards the SMLC and location information towards the GMLC. Furthermore, a CN node may identify events (e.g. emergency call set ups) which will initiate positioning of a MS.

Service Control Point (SCP) 121 in FIG. 1 is a network node which is part of IN architecture. It is able to control events, like call setup and SMS, over the CAP/INAP interface 122.

In the past, once a request for the position of a MS has been made, for example, when a call is being made, the location is calculated and subsequently provided via the CN node to the value added service platform/environment (e.g. IN/CAMEL). This has the disadvantage that there is a time delay between when the call is requested and when the location can be provided to enable the call to be made. Throughout the specification the word "call" is referred to. The skilled man will understand that this term is synonymous with any form of communication which might occur between the MS and network.

Figure 3:
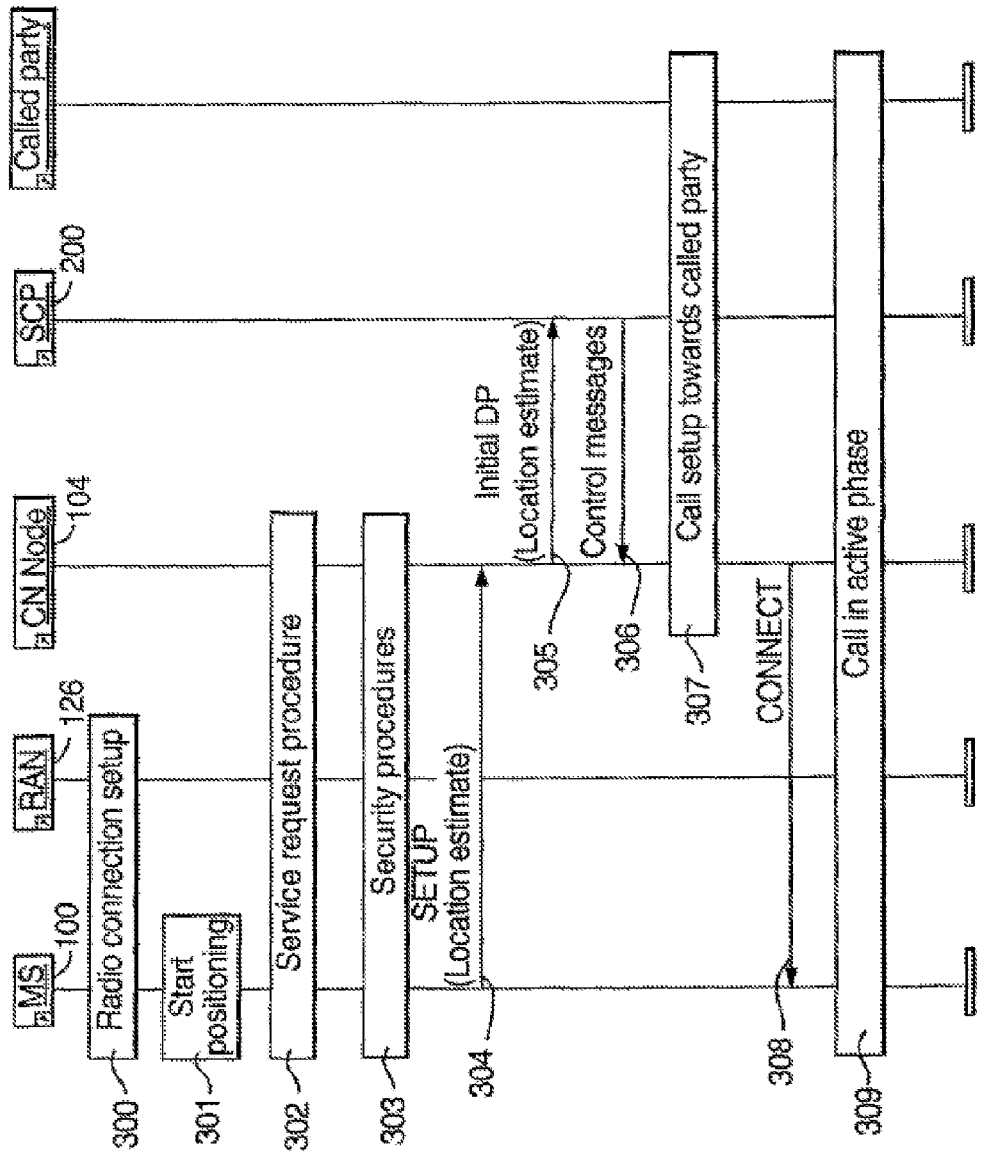
FIG. 3 illustrates a locating procedure.

FIG. 3 illustrates a first embodiment of the present invention which obviates this disadvantage by having the MS independently calculate its location, based upon information the network sends to the MS, and sends this information to the CN node during a SETUP message. In this way the location of the MS is available for the IN/CAMEL call state model in the beginning of the call setup procedure in the CN node. This has the benefit that there is no extra delay because the CN node already has the location information associated with the MS without having to make additional requests.

FIG. 3 shows the signaling which occurs between the MS 100, RAN 125, CN node 104 and service control point (SCP) 200 of an IN/CAMEL when the MS 100 is switched on. In order to understand these signals, it is first helpful to know a little more about the signaling structure itself.

The signaling structure of an IN may be broadly divided into two functional parts. The base which consists of signaling bearers, which are functions for the transport of signaling information between network elements, and signaling protocols which define how functions in network elements cooperate creating network services. In GSM, the ISDN part (ISUP) and mobile application part (MAP) are used as protocols between MSCs.

In addition, there is a standard which is well known in the art for the Base Station System Application Part (BSSAP) which defines the signaling protocol between the MSC and BSC; the Base Station System GPRS Protocol (BSSGP) which defines the signaling protocol between the SGSN and BSC; and the Radio Access Network Application Protocol (RANAP) which defines the signaling protocol between the MSC/SGSN and RNC. Communication at this stage is in the form of BSSMAP/BSSGP/RANAP signals in the BSSAP/BSSGP/RANAP protocol. Direct Transfer messages can be exchanged between the MS and CN node in relation to registration and authentication as well as when the MS is switched off. These messages are used also to convey mobility management, session management and call control related messages.

As illustrated in FIG. 3 after turning on (Power Up) the MS 100 is in idle mode and when a user wishes to initiate a call the MS first establishes a dedicated radio connection to the RAN 126.

After radio connection setup 300 the MS starts positioning procedure 301 in order to get an estimate of it location. This is done by means to LCS as described before (e.g. positioning measurements, position calculation using necessary assistance data provided by network).

Then the MS initiates a service request procedure 302 to the core network in order to create signaling connection to CN node and request a certain service. This might be for a normal call or for special messaging services (SMS) or general packet radio service (GPRS) connection. Based on subscriber's subscription profile CN node accepts service request if the subscriber is entitled to the requested service. After service request security procedures 303 like authentication and ciphering control may occur between MS and CN node.

At this stage the MS has independently calculated its location and sends details of its location along with the SETUP procedure 304 of the call (or SMS). In this way the CN node 104 is supplied with the location estimate at the beginning of the call setup procedure. The location estimate is therefore immediately available for transfer from the CN node 104 to the SCP 200 in an appropriate detection point (DP) of the basic call state model.

After reception of SETUP message the serving CN node may initialize a control relationship 305 with the Service Control Point (SCP) depending on subscriber's subscription profile. The control relationship is started with sending an Initial Detection Point (DP) message to the SCP. This message contains a set of parameters characterizing the event, e.g. a call. Based on this information an service/application residing in SCP can perform certain control operations for the call, like charging activities or rerouting of a call. The CN node shall include location estimate of the calling MS in Initial DP message, thus also this information can be used as a basis of controlling activities by the SCP.

After receiving control messages 306 from SCP the CN node shall continue the establishment of a call 307 towards the called party in normal way. Finally CN node informs the calling MS with CONNECT call control message 308 that the call establishment has been completed, and the call can proceed in active (conversation) state 309.

Since the MSC does not have to request a location estimate for the MS after it receives the SETUP signal 304 the time in which it can send/provide all the necessary information to the SCP 200 is reduced. In this way the location of the MS is available for the IN/CAMEL call state model in the beginning of the call in the CN node. The benefit of this is that there is no extra delay because the CN node has the location information without additional requests.

Figure 4:
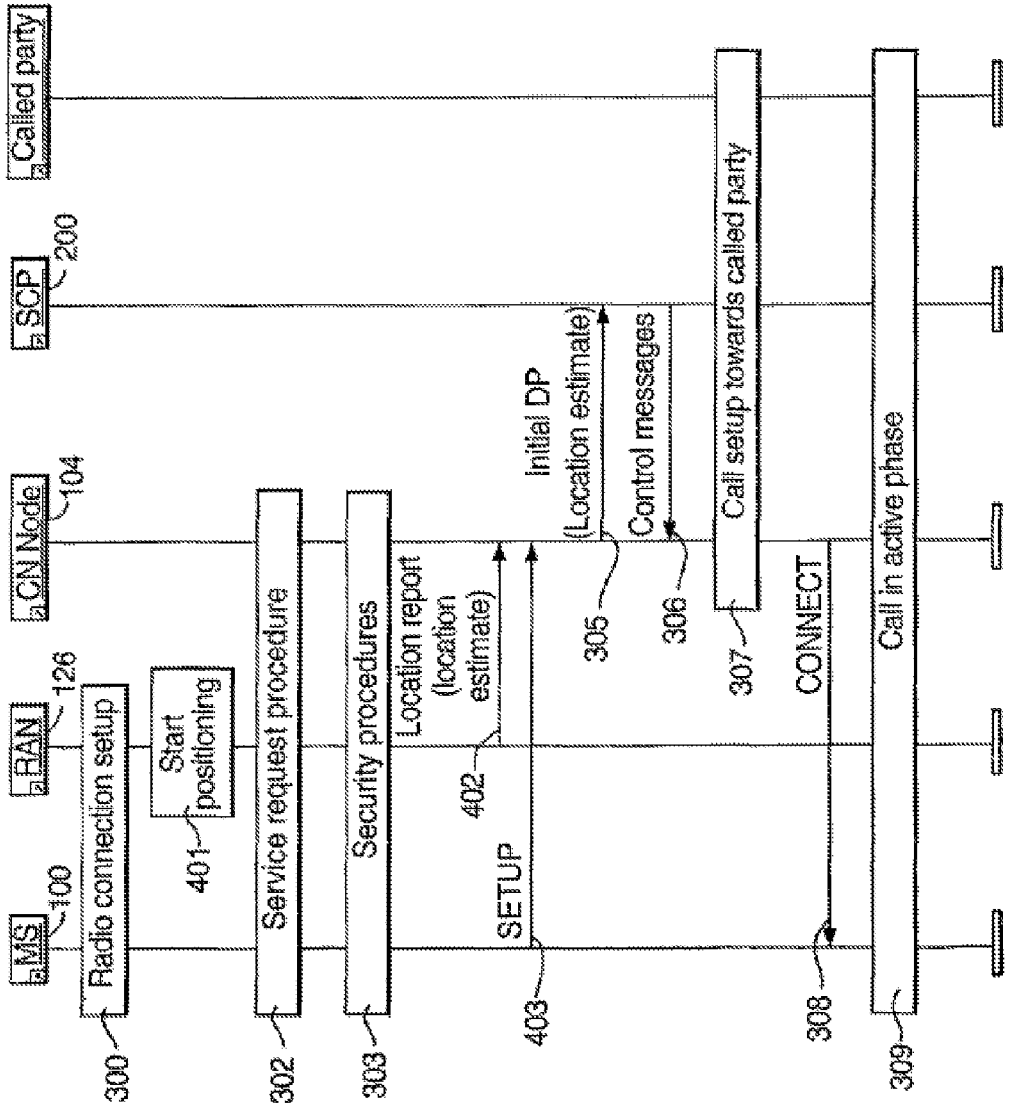
FIG. 4 illustrates a further locating procedure.

FIG. 4 illustrates a locating procedure according to a second embodiment of the present invention. In this embodiment, the general principle is that the location of the MS is available for the IN/CAMEL call state model in the beginning of the call to the CN node as per the first embodiment. However, it is the Radio Access Network (RAN) 126 which includes the BTS and BSC, which initiates the calculation of the MS position.

Initially, the MS 100 makes the radio connection setup 300 as described above. Following this RAN shall start positioning procedure 401 by requesting it from SMLC. In some cases SMLC functionality may be contained in RAN network element, i.e. BSC. In this case no explicit signaling between BSC and SMLC occurs but the positioning procedure is done internally by BSC, possibly with help of other RAN network elements like LMUs. The positioning procedure can be done with any of the conventional positioning techniques mentioned above.

During the positioning procedure in RAN the service request 302 and security procedures 303 (authentication, ciphering) can proceed as is known in the art.

Once the RAN has completed positioning procedure (i.e. the MS location has been calculated) the location estimate of the MS is sent to the CN node in a Location Report message 402. This is a message substantially containing only location information.

Once the SETUP procedure 403 has been carried out as described hereinabove, the CN node can initiate a control relationship with the SCP like described in the first embodiment 306. In this way the CN node is supplied with the location estimate for the MS at the beginning of the call setup. The location estimate is therefore immediately available for transfer from the CN node 104 to the SCP 200 in an appropriate detection point (DP) of the basic call state model. The IN/CAMEL call state model is thus able to use the information without further delay than would have been possible with prior art methods.

Figure 5:
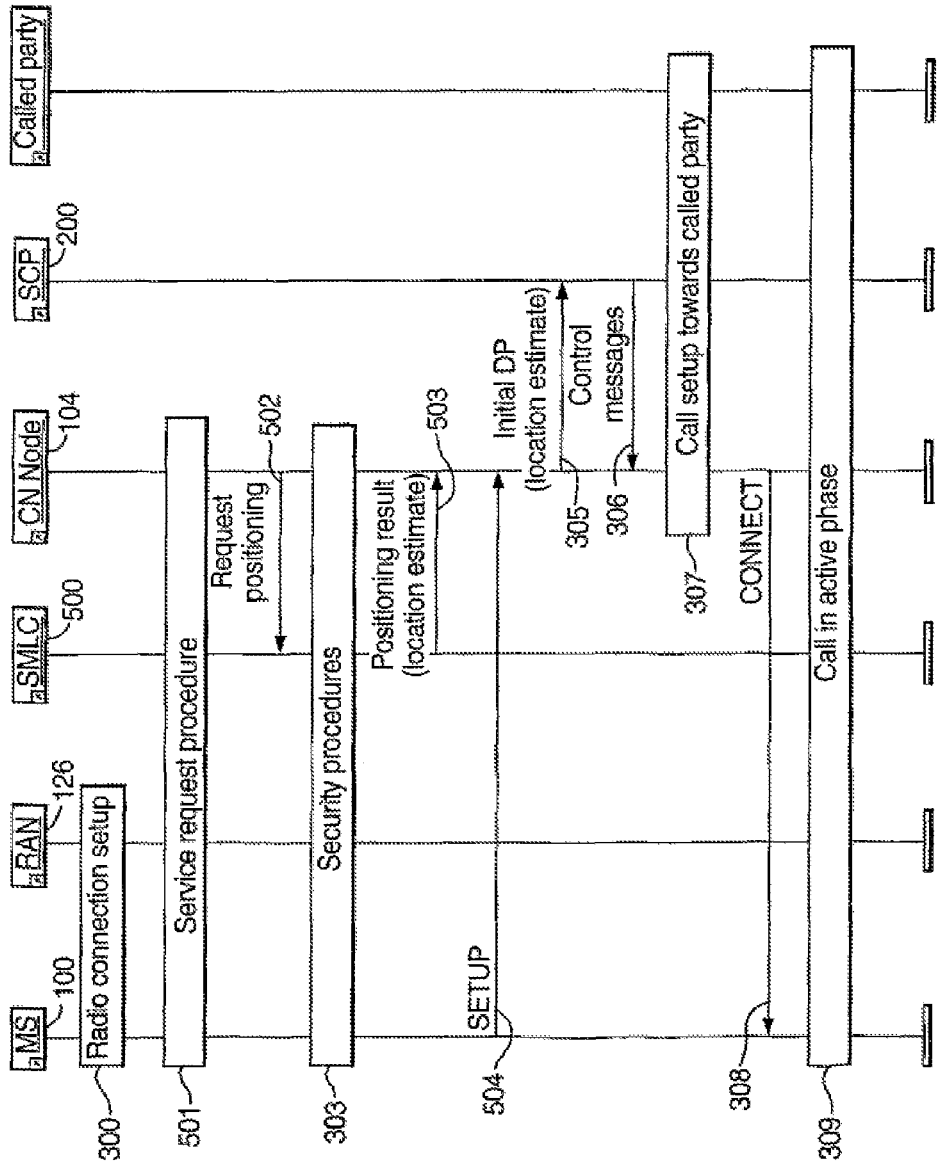
FIG. 5 illustrates a still further locating procedure.
In the drawings like reference numerals refer to like parts.

FIG. 5 illustrates a third embodiment of the present invention which is an adaptation of the second and third embodiments. In this fourth embodiment, the location of the MS is calculated in the SMLC 500 and supplied to the CN node during a call setup phase, i.e. right before or after the SETUP message depending on how long positioning procedure takes.

The MS first establishes a dedicated radio connection to the RAN. Then the MS initiates a service request procedure 501 to the core network in order to create signaling connection to CN node and request a certain service.

When the CN node 104 receives the service request 501, the CN node will decide whether or not it will attempt to locate the MS that has requested the normal call (alternatively, this could be a request for SMS or GPRS). This decision will be based upon subscriber's subscription information stored in the CN node (i.e. VLR or SGSN). In this way a subscriber who has requested or perhaps paid for an improved quality of service (QoS) can be provided with an enhanced service.

If the subscriber is associated with information which indicates it needs the location information in the beginning of the call, the CN node will send a Request positioning 502 signal to the SMLC 500. The SMLC then initiates position and calculations to determine the MS location. During positioning procedure security procedures 503 (authentication, control of ciphering) takes place as described above.

Whilst this occurs the SMLC would have calculated the location of the MS. This location can then be provided to the CN node 104 via a signal Positioning result 503. In this way the CN node is provided with the location of the MS at the beginning of a call following the setup 504 and initial DP 305 procedures as described above.

It is to be noted that, throughout the present invention, CAMEL and IN designate any solution in which a call, connection or session processing node contacts a service control function which issues instructions to the respective node. The contact to the service control function is based on, for example, a trigger information stored in the respective nodes or downloaded thereto from an external subscriber database. The trigger information may specify situations in the course of a call, connection or session handling. The service control function may be internally distributed. Furthermore, the corresponding IN protocol could be any protocol between a controlling entity, such as a service control function (eg CAMEL CSE) responsive to triggering from a call, and a session or connection processing node. The IN protocol may be, for example, an object oriented interface where the operations are object methods or invocations. The IN protocol may also be a text message based protocol such as IETF session initiation protocol (SIP).

According to each of the above described embodiments the calculated geographical location of the MS can be provided from the core network node to the service control means along with at least one communication control related event.

In the circuit switched communication control case the communication control related events are the events reported from the MSC to the SCP at the IN basic call statemodel detection points. The basic call state models (BCSM) are an essential issue in Intelligent Networks. The BCSMs contain the points of attachment to call processing for the external control. A BCSM is a simplified model of the call handling procedures within a digital exchange. The IN specifications have grouped the call handling procedures to certain coarse phases. These phases are called Points In Call (PIC). When a phase either successfully finishes or aborts because of a specified reason, a Detection Point (DP) is encountered. The call set-up or release processing can be temporarily stopped in these detection points and the SCF may be requested for call handling instructions.

There are two kinds of detection points. An initial enquiry to the SCF can be made in the Trigger Detection Points (TDP). This means that a service logic program in the SCF is provided with the set-up information of the call being handled. The service logic program makes decisions according to the information provided. It may issue some instructions to the exchange and after that either give permission to continue, perhaps with modified information, or request call clearing.

The service logic program may arm one or more detection points dynamically after it has been invoked in the initial enquiry. The detection points that can be armed dynamically are called Event Detection Points (EDP). A subsequent trigger detection point can also be armed dynamically ie it can also be an event detection point. Dynamic arming means that the service logic program explicitly requests the exchange to report if it encounters any of the detection points. The report may either be a notification after which call processing continues directly or an enquiry in which call processing is frozen and instructions from the service logic program are waited for.

There are detection points for call related events such as call set-up request received, dialing collection completed, number analyzed, call answered, called party busy etc.

In the case of GPRS connection control the events are, for example, GPRS events that can be reported to a service control function such as establishment of GPRS mobility management context, the opening, update and deletion of PDP contexts or various DPD context related timer expiries, Packet related communication control events could also include the reception and transmission of an individual user data packet.

It will be understood by those skilled in the art that modifications could be made to the above described example without departing from the scope of the present invention.

What is claimed is:

1. A method comprising:
    causing, at least in part, a detection of a request for an establishment of a communication session over a communications network with a mobile terminal;
    determining, in response to the request, location information of the mobile terminal for use in the establishment of the communication session; and
    determining to generate a setup request for the establishment of the communication session for forwarding, along with the location information, to a core node of the communications network.

2. A method as in claim 1, further comprising:
    determining to generate a control initiation message to forward, along with the location information, to a service node of the communications network, for initiating control functions associated with the establishment of the communications session.

3. A method as in claim 2, further comprising:
    receiving, in response to the control initiation message, one or more control messages from the service node; and
    causing, at least in part, the establishment of the communication session between the mobile terminal and a destination entity.

4. A method as in claim 3, wherein the destination entity is associated with an emergency call center.

5. A method as in claim 2, wherein the control initiation message includes one or more parameters characterizing the communication session.

6. A method as in claim 1, wherein the location information comprises one or more of geographic location information or at least one location identifier.

7. A method as in claim 1, wherein the location information is determined by either a time of arrival positioning process, an enhanced-observed time difference positioning process, a global positioning system positioning process, or a combination thereof.

8. A method as in claim 1, wherein the location information is provided to the core node prior to an initial point of the communication session establishment between the core node and the service node.

9. A method as in claim 1, wherein the determining location information is performed at either the mobile terminal, a positioning system accessed on the communications network, or a combination thereof.

10. A method as in claim 1, wherein the core node comprises a core switching node of the communications network.

11. A method as in claim 1, wherein the core node comprises one of a mobile switching centre or Serving General Packet Radio Service (GPRS) Support Node, depending on a switching domain of the communications network.

12. A method as in claim 1, wherein the service node includes control functionality for intelligent network services.

13. An apparatus, comprising:
    at least one processor; and
    at least one memory including computer program code for one or more programs,
    the at least one memory and the computer program code configured to, with the at least one processor, cause the apparatus to perform at least the following,
        cause, at least in part, a detection of a request for an establishment of a communication session over a communications network with the apparatus;
        determine, in response to the request, location information of the apparatus for use in the establishment of the communication session; and
        determine to generate a setup request for the establishment of the communication session for forwarding, along with the location information, to a core node of the communications network.

14. An apparatus as in claim 13, wherein the apparatus is caused to further perform at least the following,
    determine to generate a control initiation message to forward, along with the location information, to a service node of the communications network, for initiating control functions associated with the establishment of the communications session.

15. An apparatus as in claim 14, wherein the apparatus is caused to further perform at least the following,
    receive, in response to the control initiation message, one or more control messages from the service node; and
    cause, at least in part, the establishment of the communication session between the apparatus and a destination entity.

16. An apparatus as in claim 15, wherein the destination entity is associated with an emergency call center.

17. An apparatus as in claim 14, wherein the control initiation message includes one or more parameters characterizing the communication session.

18. An apparatus as in claim 13, wherein the location information comprises one or more of geographic location information or at least one location identifier.

19. An apparatus as in claim 13, wherein the location information is determined by either a time of arrival positioning process, an enhanced-observed time difference positioning process, a global positioning system positioning process, or a combination thereof.

20. An apparatus as in claim 13, wherein the location information is provided to the core node prior to an initial point of the communication session establishment between the core node and a service node.

21. An apparatus as in claim 20, wherein the service node includes control functionality for intelligent network services.

22. An apparatus as in claim 13, wherein the determining location information is performed at either the mobile terminal, a positioning system accessed on the communications network, or a combination thereof.

23. An apparatus as in claim 13, wherein the core node comprises a core switching node of the communications network.

24. An apparatus as in claim 13, wherein the core node comprises one of a mobile switching centre or Serving General Packet Radio Service (GPRS) Support Node, depending on a switching domain of the communications network.

25. A method comprising:
    receiving, at a core node of a communications network, a setup request for an establishment of a communication session over a communications network with a mobile terminal, wherein the setup request is received along with location information for the mobile terminal for use in the establishment of the communication session; and
    determining to generate a control initiation message, including the location information, for provision to a service node of the communications network, for initiating control functions associated with the establishment of the communications session.

26. A method as in claim 25, further comprising:
    causing, at least in part, a provision of the control initiation message to the service node of the communications network, and
    causing, at least in part, the establishment of the communication session between the mobile terminal and a destination entity.

27. A method as in claim 26, wherein the destination entity is associated with an emergency call center.

28. A method as in claim 25, further comprising:
    receiving, in response to the control initiation message, one or more control messages from the service node.

29. A method as in claim 25, wherein the control initiation message includes one or more parameters characterizing the communication session.

30. A method as in claim 25, wherein the core node receives the location information prior to an initial point of the communication session establishment between the core node and the service node.

31. A method as in claim 25, wherein the core node comprises a core switching node of the communications network.

32. A method as in claim 25, wherein the core node comprises one of a mobile switching centre or Serving General Packet Radio Service (GPRS) Support Node, depending on a switching domain of the communications network.

33. A method as in claim 25, wherein the service node comprises a node of the communications network that includes control functionality for intelligent network services.

34. An apparatus, comprising:
    at least one processor; and
    at least one memory including computer program code for one or more programs,
    the at least one memory and the computer program code configured to, with the at least one processor, cause the apparatus to perform at least the following,
    receive a setup request for an establishment of a communication session over a communications network with a mobile terminal, wherein the setup request is received along with location information for the mobile terminal for use in the establishment of the communication session; and
    determine to generate a control initiation message including the location information for provision to a service node of the communications network, for initiating control functions associated with the establishment of the communications session.

35. An apparatus as in claim 34, wherein the apparatus is caused to further perform at least the following,
    cause, at least in part, a provision of the control initiation message to the service node of the communications network, and
    cause, at least in part, the establishment of the communication session between the mobile terminal and a destination entity.

36. An apparatus as in claim 35, wherein the destination entity is associated with an emergency call center.

37. An apparatus as in claim 34, wherein the apparatus is caused to further perform at least the following,
    receive, in response to the control initiation message, one or more control messages from the service node.

38. An apparatus as in claim 34, wherein the control initiation message includes one or more parameters characterizing the communication session.

39. An apparatus as in claim 34, wherein the core node receives the location information prior to an initial point of the communication session establishment between the core node and the service node.

40. A method comprising facilitating a processing of and/or processing (1) data and/or (2) information and/or (3) at least one signal, the (1) data and/or (2) information and/or (3) at least one signal based, at least in part, on the following:
    a processing, at a core node of a communications network, of a setup request for an establishment of a communication session over a communications network with a mobile terminal, wherein the setup request is received along with location information for the mobile terminal for use in the establishment of the communication session; and
    at least one determination to generate a control initiation message, including the location information, for provision to a service node of the communications network, for initiating control functions associated with the establishment of the communications session.

41. A method as in claim 40, wherein the (1) data and/or (2) information and/or (3) at least one signal are further based, at least in part, on the following:
    a provision of the control initiation message to the service node, and
    the establishment of the communication session between the mobile terminal and a destination entity.

42. A method as in claim 41, wherein the destination entity is associated with an emergency call center.

43. A method as in claim 40, wherein the (1) data and/or (2) information and/or (3) at least one signal are further based, at least in part, on the following:
    a processing, in response to the control initiation message, of one or more control messages from the service node.

44. A method as in claim 40, wherein the control initialization message includes one or more parameters characterizing the communication session.

45. A method as in claim 40, wherein the core node receives the location information prior to an initial point of the communication session establishment between the core node and the service node.

46. A method as in claim 40, wherein the core node comprises a core switching node of the communications network.

47. A method as in claim 40, wherein the core node comprises one of a mobile switching centre or Serving General Packet Radio Service (GPRS) Support Node, depending on a switching domain of the communications network.

48. A method as in claim 40, wherein the service node comprises a node of the communications network that includes control functionality for intelligent network services.

49. A system comprising:
a mobile terminal configured to,
   cause, at least in part, a detection of a request for an establishment of a communication session over a communications network,
   in response to the request, determine location information of the mobile terminal for use in the establishment of the communication session,
   determine to generate a setup request for the establishment of the communication session, and
   cause, at least in part, a forwarding of the setup request, along with the location information, to a core node of the communications network; and
the core node configured to determine to generate a control initiation message to forward, along with the location information, to a service node of the communications network, for initiating control functions associated with the establishment of the communications session.

50. A system as in claim 49, wherein the core node is further configured to receive, in response to the control initiation message, one or more control messages from the service node, and to cause, at least in part, the establishment of the communication session between the mobile terminal and a destination entity.

51. A system as in claim 50, wherein the destination entity is associated with an emergency call center.

52. A system as in claim 49, wherein the control initiation message includes one or more parameters characterizing the communication session.

53. A system as in claim 49, wherein the location information comprises one or more of geographic location information or at least one location identifier.

54. A system as in claim 49, wherein the location information is determined by either a time of arrival positioning process, an enhanced-observed time difference positioning process, a global positioning system positioning process, or a combination thereof.

55. A system as in claim 49, wherein the location information is provided to the core node prior to an initial point of the communication session establishment between the core node and the service node.

56. A system as in claim 49, wherein the determination of the location information is performed at either the mobile terminal, a positioning system accessed on the communications network, or a combination thereof.

57. A system as in claim 49, wherein the core node comprises a core switching node of the communications network.

58. A system as in claim 49, wherein the core node comprises one of a mobile switching centre or Serving General Packet Radio Service (GPRS) Support Node, depending on a switching domain of the communications network.

59. A system as in claim 49, wherein the service node includes control functionality for intelligent network services.

60. A method comprising:
providing a location application of a communication network with location information indicating the geographical location of a mobile station, via a core network node serving the mobile station;
initiating a communication between the mobile station and the network;
calculating the geographical location;
subsequently initiating establishment of a call between the mobile station and the network, wherein the initiation includes supplying location information indicating the calculated geographical location to the core network node; and
subsequently routing the call between the mobile station and the network.

61. The method as in claim 60, further comprising:
independently calculating the geographical location of the mobile station by the mobile station;
   attaching the independently calculated geographical location to a setup message; and
   transmitting the setup message, along with the independently calculated geographical location, to the core network, wherein the core network is provided with the geographical location of the mobile station without additional requests for the geographical location of the mobile station.

\* \* \* \* \*